United States Patent [19]

Ireland

[11] Patent Number: 5,624,063
[45] Date of Patent: Apr. 29, 1997

[54] RIDE-READY BICYCLE CARRIER

[75] Inventor: Richard Ireland, Rancho Cucamonga, Calif.

[73] Assignee: Sport Carriers, Inc., Grand Terrace, Calif.

[21] Appl. No.: 615,448

[22] Filed: Mar. 14, 1996

[51] Int. Cl.$^6$ .................................................. B60R 9/04
[52] U.S. Cl. ........................ 224/324; 224/319; 224/315; 224/924
[58] Field of Search .................... 224/319, 324, 224/315, 567, 569, 570, 924

[56] References Cited

U.S. PATENT DOCUMENTS

| | | | |
|---|---|---|---|
| 4,629,104 | 12/1986 | Jacquet | 224/324 |
| 4,702,401 | 10/1987 | Graber et al. | 224/924 |
| 5,169,044 | 12/1992 | Englander | 224/324 |
| 5,284,282 | 2/1994 | Mottino | 224/319 X |
| 5,435,475 | 7/1995 | Hudson et al. | 224/324 |

FOREIGN PATENT DOCUMENTS

| | | | |
|---|---|---|---|
| 97617 | 12/1939 | Sweden | 224/924 |

Primary Examiner—Renee S. Luebke
Attorney, Agent, or Firm—Lyon & Lyon

[57] ABSTRACT

A ride-ready bicycle carrier system designed to be removably attached to an existing vehicle roof rack system. The carrier system comprises a support arm assembly attached to a support arm pivot. The support arm assembly has a support arm, an upper hook, a lower hook and a ball lock. One end of the support arm is adapted to receive the upper hook and the other end of the support arm is connected to the support arm pivot. One end of the upper hook is shaped to engage the upper lateral bar of a bicycle frame and the other end of the upper hook is adapted to engage the ball lock and inserts into the ball lock and then into the upper end of the support arm. The ball lock is adapted to receive the upper hook. The ball lock secures the upper hook in a fixed position when the upper hook is engaged to the upper lateral bar of a bicycle frame. The lower hook is attached to the support arm and is adapted to engage either the front fork or rear axle frame support of a bicycle depending on the orientation of the bicycle on the carrier system.

18 Claims, 5 Drawing Sheets

RIDE-READY BICYCLE CARRIER

FIELD OF THE INVENTION

The present invention relates to bicycle carriers, and more specifically, to a roof-mounted ride-ready bicycle carrier.

BACKGROUND OF THE INVENTION

Because people enjoy riding bicycles in a variety of locations, it is often necessary to transport a bicycle by a vehicle such as a car. In many cases, however, the bicycle will not fit inside the vehicle. Even if the bicycle does fit into the vehicle, the bicycle takes up a lot of interior or trunk space and may make it uncomfortable for the passengers. Therefore, it is often desirable to carry a bicycle on the exterior of a vehicle. Many bicycle carriers have been designed which transport bicycles on the exterior of a vehicle. One general classification of bicycle carriers encompasses rooftop mounted bicycle carriers. The two most common rooftop bicycle carriers are the fork-mount bicycle carrier and the upright bicycle carrier.

In the fork-mount bicycle carrier the front wheel of the bicycle must be removed so that the front wheel forks can be mounted and secured into a holding device. The rear wheel remains attached to the bicycle and is secured to the bicycle carrier using a wheel holding device.

In the upright bicycle carrier the bicycle can be mounted to the carrier without removing the front wheel. Therefore, the bicycle is in a ride-ready condition when it is removed from the carrier. In this carrier design, both the front and rear wheels are secured to the bicycle carrier using wheel holding devices. The bicycle is further stabilized using a support arm that engages a part of the bicycle. One such design being used today engages the front down tube of the bicycle frame. Another design is described in U.S. Pat. No. 5,435,475, entitled "Ride-Ready Bike Carrier System," which is assigned to the Assignee of the present application. In the invention disclosed in U.S. Pat. No. 5,435,475, the support arm attaches to a combination of the bicycle frame and rear wheel axle.

Both of these types of rooftop bicycle carriers, while useful in certain situations, have some design features which are not optimal in other situations. For example, use of the fork-mount bicycle carrier is considered by some to be inconvenient and time consuming because the front wheel of the bicycle must be removed to mount the bicycle to the carrier and then the front wheel must be reinstalled when the bicycle is removed from the carrier.

Existing upright carriers have disadvantages as well. One drawback to the upright carriers which engage the front down tube is that the support arm used to secure the front down tube is designed to hold a traditionally-shaped cylindrical tube. Many of the newer bicycle frame designs utilize non-cylindrical shapes for the front down tube of the bicycle frame. A different, custom designed, support arm is required every time a bicycle of differing shape needs to be mounted on an upright bicycle carrier. This drawback limits the compatibility of this type of carrier to hold different shaped bicycle frames.

Although the upright bicycle carrier which engages the frame and rear wheel axle combination, described in U.S. Pat. No. 5,435,475, allows compatibility with various frame shapes and wheel sizes, it requires an adjustment of the support arm location to hold bicycles of differing wheel size. In addition, this bicycle carrier requires the attachment of at least two fasteners to secure the support arm. One fastener, a U-clamp, engages the combination of the bicycle frame and rear wheel axle and another fastener, a cone adjuster nut, engages the end of the rear wheel axle.

SUMMARY OF THE INVENTION

The present invention is directed to an improved bicycle carrier which allows a bicycle to be transported in a ride-ready condition, which is compatible with a variety of bicycle sizes and frame shapes with few adjustments and which requires engagement of a minimal number of fasteners in order to attach a bicycle to the carrier.

The ride-ready bicycle carrier of the present invention is designed to be attached to the crossbars of an existing vehicle roof rack system. Commonly used roof rack systems generally comprise two crossbars, a from crossbar and a rear crossbar, which are attached to the roof of a vehicle.

The ride-ready bicycle carrier comprises a tire bar which has front and rear wheel holders mounted on it. In the preferred embodiment, both wheel holders can be adjusted back and forth on the tire bar to accommodate different size bicycles. In an alternative embodiment, only one of the wheel holders is adjustable. The wheel holders have straps to secure a front and rear wheel of a bicycle. The tire bar is attached to the front and rear crossbars using a front tire bar clamp and a rear tire bar clamp, respectively.

A particularly innovative support arm assembly is attached to a support arm pivot which allows the support arm assembly to be rotated about the support arm pivot. The support arm pivot is pivotally attached to a pivot support assembly. The pivot support assembly is attached to the front crossbar by clamping it between the tire bar and the front crossbar using the front tire bar clamp. Preferably, the support arm assembly rotates about the support arm pivot in a semi-circular motion in a plane perpendicular to the axis of the wheels of a bicycle mounted on the bicycle carrier. Alternatively, the support arm pivot may be oriented such that the support arm rotates in other directions whereby the support arm can be rotated into place to engage a bicycle mounted on the bicycle carrier.

The support arm assembly comprises a support arm, an upper hook, a lower hook and a ball lock. The upper hook comprises the upper end of the support arm and is adjustable so that it can be positioned to engage the upper lateral bar of a bicycle frame. The upper hook has a straight section with notches adapted to engage the ball lock and a curved section adapted to secure the bicycle frame. The ball lock is connected to the upper end of the pivot arm and is adapted to receive the slotted end of the upper hook. The support arm is preferably an elongate hollow shaft so that the upper hook inserts into the ball lock and then into the upper end of the pivot arm. The lower hook is connected to the support arm and is positioned below the upper hook to engage either the from fork of the bicycle frame or the rear axle frame support, depending on the orientation of the bicycle on the carrier (either front of the bicycle to the front of the vehicle, or rear of the bicycle to the front of the vehicle).

In order to mount a bicycle on the carrier, first the bicycle is placed onto the carrier with the bicycle wheels resting on the front and rear wheel holders. The support arm assembly is then rotated about the support arm pivot moving the upper hook above the lateral bar of the bicycle frame. At the same time, the lower hook engages either the front fork or the rear axle support, depending upon the orientation of the bicycle. In addition to securing the bicycle to the bicycle carrier, the support arm also assists in the loading of a bicycle onto the bicycle carrier. With the support arm pivoted to the up position the user may lean the bicycle against the support arm while securing the wheels to the wheel holders. In this way, the bicycle is supported in a vertical position by the support arm which frees both hands of the user to secure the wheel straps. The bicycle is secured to the tire bar by fastening the wheel holder straps to the bicycle wheels. The upper hook is then pushed downward into the ball lock and support arm until it firmly engages the lateral bar of the bicycle frame. The ball lock locks the upper hook into position thereby securing the bicycle onto the bicycle carrier. Alternatively, the upper hook may be engaged over the lateral bar prior to fastening the wheel holder straps.

Therefore, with the carrier of the present invention, the support arm assembly can secure a bicycle to the carrier by securing only one fastener, namely the upper hook. Furthermore, since the upper hook is adjustable, the carrier can accommodate bicycles of varying sizes and shapes in a ride-ready condition. Moreover, the ball lock provides security from theft of a mounted bicycle.

Additionally, unlike the prior art which uses a support arm which secures a bicycle by the axle, the support arm of the bicycle carrier of the present invention engages the main frame near the top of the bicycle. This position provides greater strength and stability in supporting the bicycle than a carrier which secures the bicycle at the wheel axle which is toward the bottom of an upright bicycle.

Accordingly, an object of this invention is to provide an improved ride-ready bicycle carrier.

BRIEF DESCRIPTION OF THE DRAWINGS

FIG. 3b is a bottom view of a slot and detents in a support arm pivot viewed from the bottom of FIG. 3a.

DESCRIPTION OF THE PREFERRED EMBODIMENT

Figure 1:
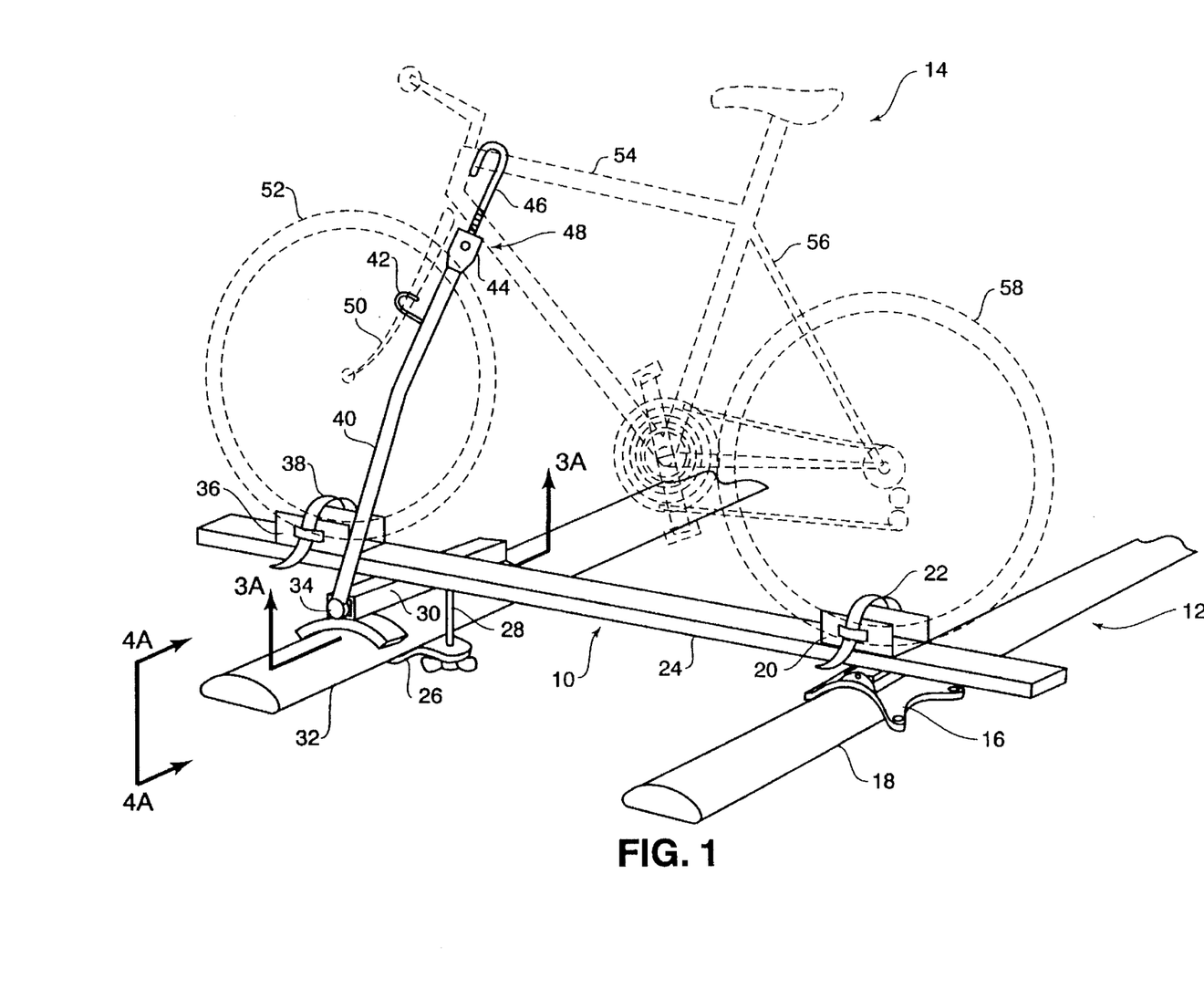
FIG. 1 is a perspective view of a bicycle installed on a ride-ready bicycle carrier of the present invention with the front wheel of the bicycle directed toward the front of the vehicle.

Referring to FIG. 1, a ride-ready bike carrier 10 according to the present invention is shown with a bicycle 14 installed with the front of the bicycle directed toward the front of the vehicle. The carrier 10 is designed to be removably attached to an existing roof rack system 12. The existing roof rack system 12, known to those skilled in the art, generally comprises two crossbars, a front crossbar 32 and a rear crossbar 18, which are attached to the roof of a vehicle (not shown). The tire bar 24 is attached to the front crossbar 32 using a front tire bar clamp 26. The tire bar 24 is attached to the rear crossbar 18 using a rear tire bar clamp 16. Front and rear wheel holders, 36 and 20 respectively, are mounted on the tire bar 24. The front and rear wheel holders, 36 and 20 respectively, comprise front and rear wheel holder straps, 38 and 22 respectively.

Figure 2:
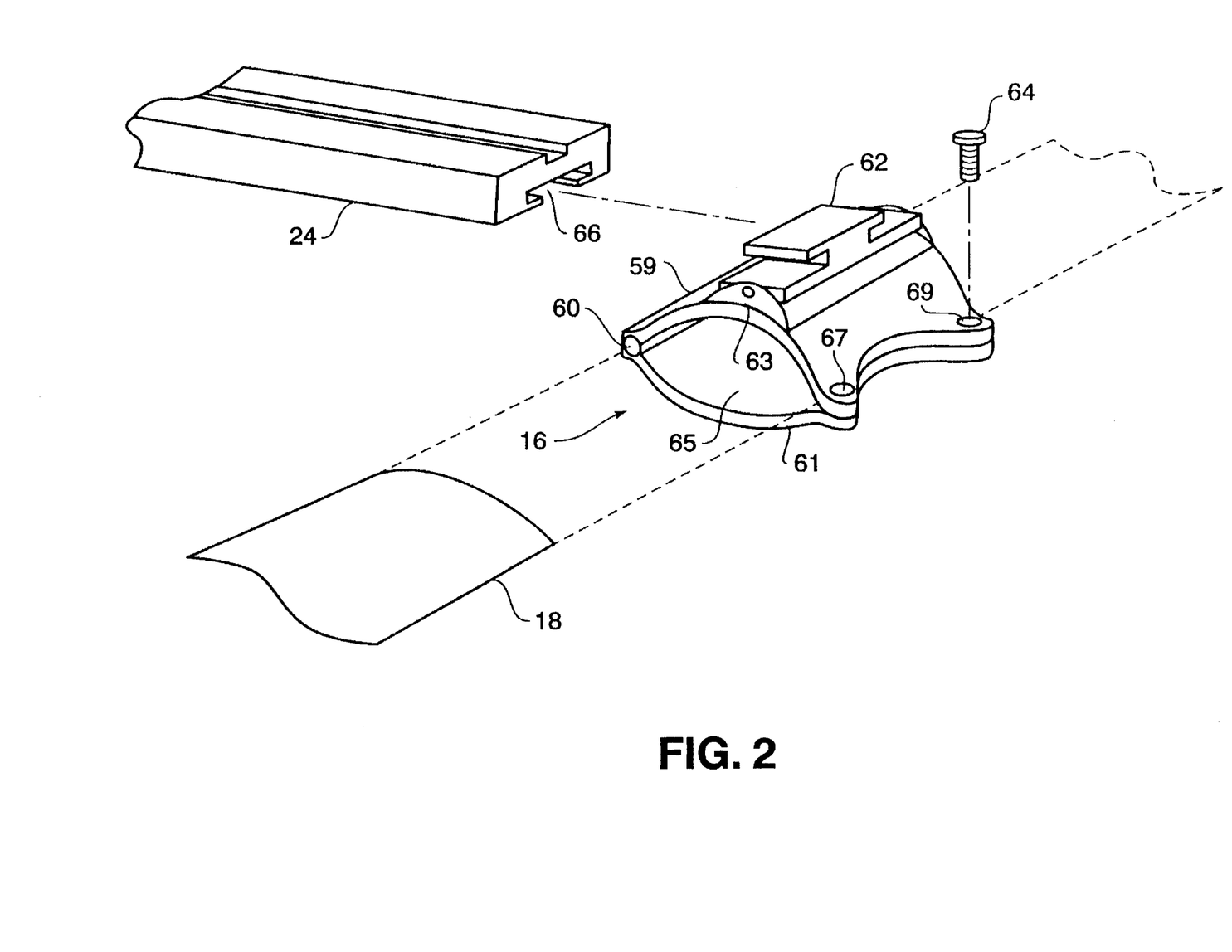
FIG. 2 is a perspective view of a rear tire bar clamp.

FIG. 2 shows a detailed view of a rear tire bar clamp 16. The rear tire bar clamp 16 comprises an upper part 59 and a lower part 61 connected by a hinge 60. The upper part 59 has an inner surface 63 which is curved to match the shape of the crossbar 18. A rear "T" block slide 62 is connected to the upper part 59. The rear "T" block slide 62 engages a "T" slot 66 of the tire bar 24. The connection of the rear "T" block slide 34 and the "T" slot 66 secures the rear portion of the tire bar 24 of the bicycle carrier 10 to the roof rack system 12. The lower part 61 also has an inner surface 65 which is curved to match the shape of the crossbar 18. The rear tire bar clamp 16 fits over the rear crossbar 18 (shown in phantom) such that the inner surfaces 65 and 63 of the upper part 59 and lower part 61, respectively, contact the rear crossbar 18. Two bolts 64 (only one of the bolts is shown) pass through holes 67 and 69 in the upper part 59 and lower part 61 to secure the rear tire bar clamp 16 to the rear crossbar 18.

Figure 3A:
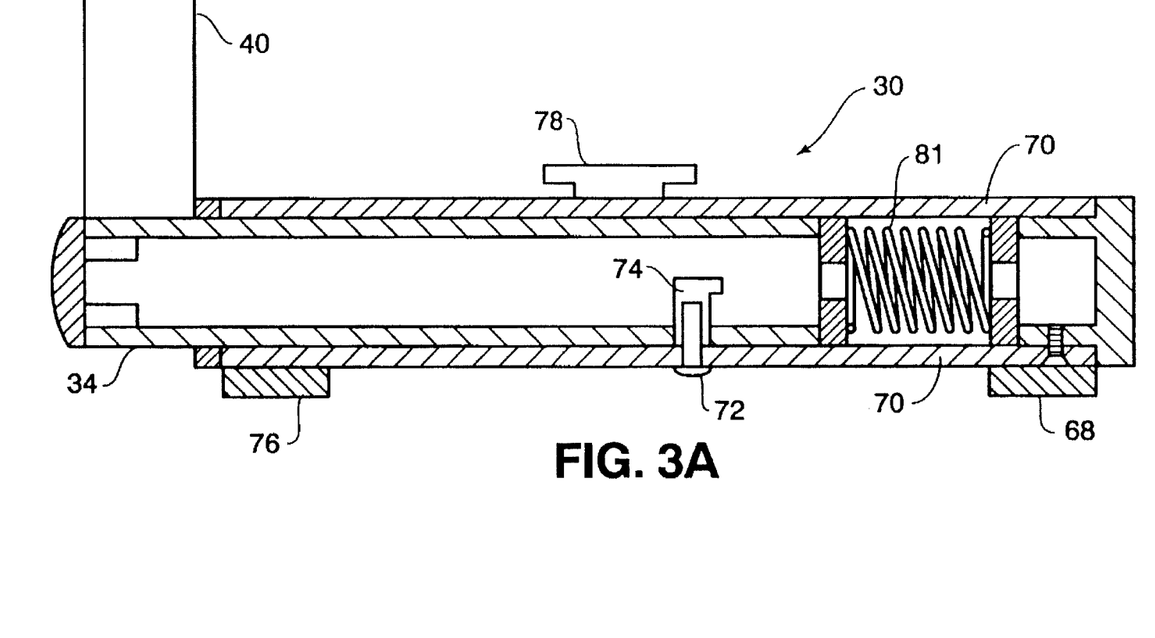
FIG. 3a is a cross-sectional view of a pivot support assembly taken along line 3a—3a in FIG. 1.
Figure 3B:
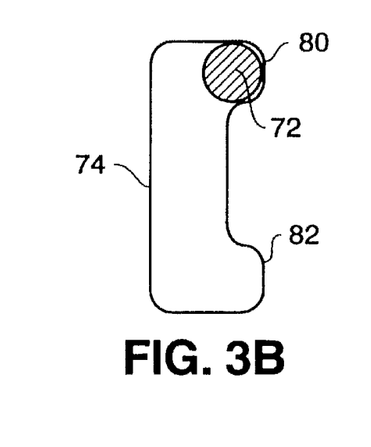

Turning now to FIG. 3a, this is a cross-section of a pivot support assembly 30. The pivot support assembly 30 has two feet, 68 and 76, which rest on the crossbars (not shown) of an existing roof rack system 12. The feet, 68 and 76, are attached to a pivot support member 70. The pivot support member 70 has a cylindrical hole adapted to receive a support arm pivot 34 and a spring 81. Attached to the support arm pivot 34 is a support arm 40. A front "T" block slide 78 is attached to the pivot support member 70. The "T" slot 66 in the tire bar 24 (shown in FIG. 2) slides over the front "T" block slide 78 thereby securing the front of the tire bar 24 of the bicycle carrier 10 to the roof rack system 12. The support arm pivot 34 is a cylindrically shaped rod and has a slot 74 with two detents 80 and 82 shown in detail in FIG. 3b. A stop pin 72 is fixed in the pivot support member 70 and extends through the pivot support member 70 into the slot 74 of the support arm pivot 34. The support arm pivot 34 is spring loaded by the spring 81 to engage the stop pin 72 into the detents 80 and 82 when the support arm pivot 34 is rotated to the up position or down position. The stop pin 72 engages the detent, 80 or 82, and holds the support arm 40 in a fixed position. In order to rotate the support arm 40 from a stop position the stop pin 72 is disengaged from the detent, 80 or 82, by pushing the support arm pivot 34 inwardly thereby compressing the spring 81 and moving the detent, 80 or 82, away from the stop pin 72.

Figures 4A, 4B:
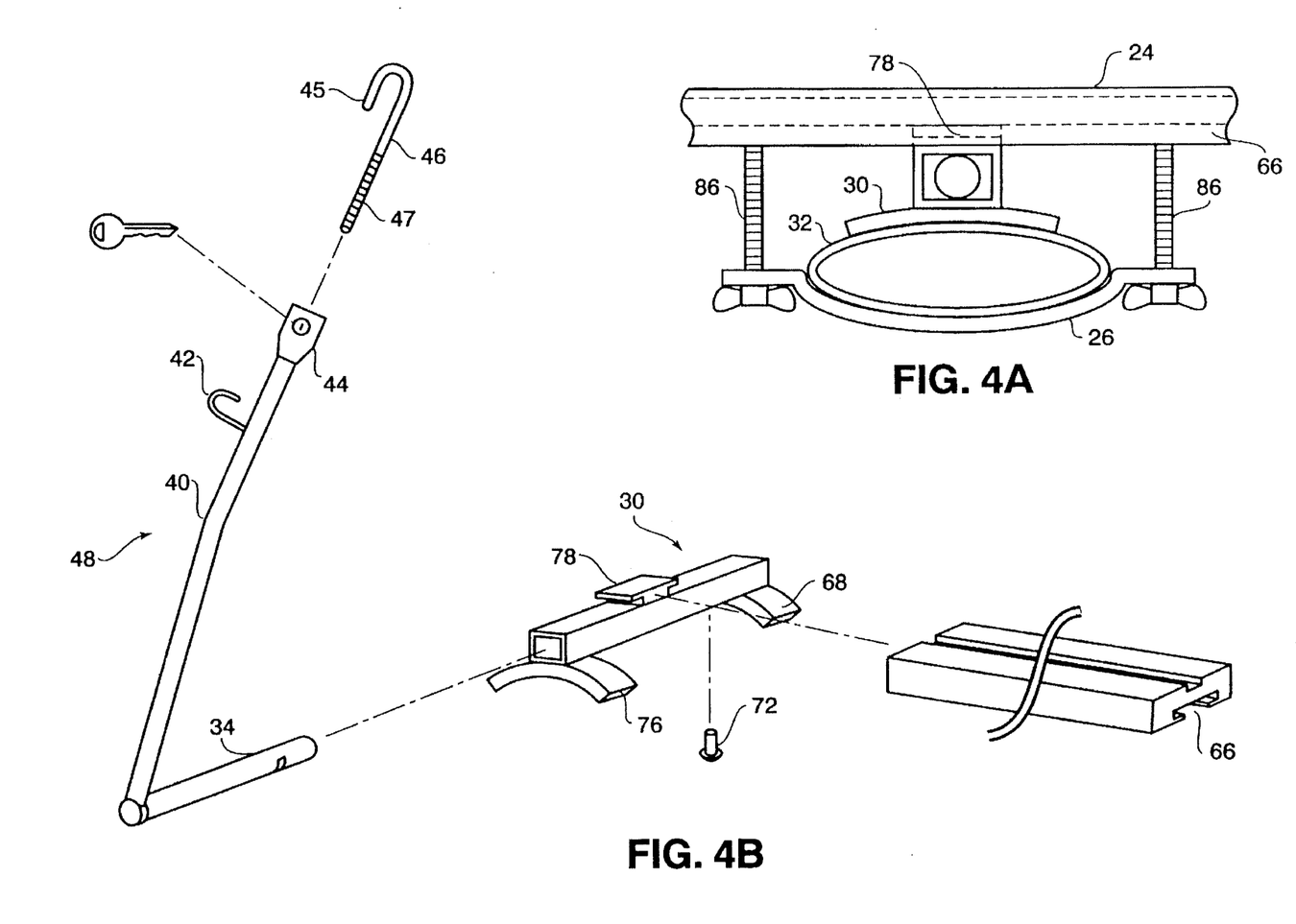
FIG. 4a is a side view of a tire bar and pivot support assembly installed on a crossbar of an existing vehicle roof rack system.
FIG. 4b is an exploded perspective view of a support arm assembly and pivot support assembly.

Referring now to FIG. 4a, this is a detailed side view of the tire bar 24 and the pivot support assembly 30 installed on a front crossbar 32 of an existing roof rack system. The tire bar 24 has a "T" slot 66 which slides onto the front "T" block slide 78. A front tire bar clamp 26 fits under the front crossbar 32 so that the pivot support member 30 is sandwiched between the tire bar 24 and the front tire bar clamp 26. A pair of "T" bolts 86 secure the front tire bar clamp 26 to the tire bar 24 thereby clamping the pivot support assembly 30 to the tire bar 24.

Turning now to FIG. 4b, a support arm assembly 48 is shown connected to a support arm pivot 34. The support arm assembly 48 comprises a support arm 40, an upper hook 46, a lower hook 42 and a ball lock 44. The support arm 40, preferably made from a cylindrical hollow shaft, is shaped to locate the lower hook 42 and the upper hook 46 in the proper position to engage the frame of a bicycle. In alternative embodiments of the present invention, the hook portion of the upper and lower hooks that secure the bicycle 14 to the carrier 10 may be replaced with brackets, straps, clasps, or any other fastener which can be used to secure the bicycle 14 to the carrier 10.

The lower end of the support arm 40 is connected to the support arm pivot 34. The upper end of the support arm 40 is connected to the ball lock 44 and is hollow so that the upper hook 46 slides into the support arm 40. The lower hook 42 is connected to the support arm 40 and is positioned below the ball lock 44 to engage either the from fork 50 or the rear axle frame support 56 of a bicycle 14 (shown in FIG. 1 ), depending on the orientation of the bicycle 14 on the carrier 10 (either from of the bicycle or the rear of the bicycle being directed toward the from of the vehicle). The upper hook 46 has a curved section 45 adapted to secure the lateral bar of a bicycle frame 54 (shown in FIG. 1) and a straight section 47 with notches adapted to engage the ball lock 44. The upper hook 46 inserts into the ball lock 44 and then into the upper end of the support arm 40. The ball lock 44 is adapted to receive and lock in place the slotted end of the upper hook 46.

Referring back to FIG. 1, the installation of a bicycle 14 onto the bicycle carrier 10 with the from of the bicycle 14 facing the front of the vehicle will be described in detail. First, the bicycle 14 is placed onto the bicycle carrier 10 with the bicycle wheels 52 and 58 resting in the wheel holders, 36 and 20. The front bicycle wheel 52 rests in the front wheel holder 36 and the rear bicycle wheel 58 rests in the rear wheel holder 20.

The support arm assembly 48 is then rotated so that the upper hook 46 is above the lateral bar 54 of the bicycle 14. At the same time, the lower hook 42 engages the from fork 50 of the bicycle 14. With the support arm assembly 48 rotated to the up position the user may lean the bicycle 14 against the support arm assembly 48. In this way, the bicycle 14 is supported in a vertical position by the support arm assembly 48 which frees both hands of the user to secure the wheel holder straps 22 and 38. The front bicycle wheel 52 is secured to the tire bar 24 by fastening the front wheel holder strap 38. In a similar manner, the rear bicycle wheel 58 is secured to the tire bar 24 by fastening the rear wheel holder strap 22.

The upper hook 46 is pushed downward into the ball lock 44 and support arm 40 until the upper hook 46 firmly engages the lateral bar 54 of the bicycle 14. The ball lock 44 locks the upper hook 46 into position thereby securing the bicycle 14 on the bicycle carrier 10. In an alternative installation procedure, the upper hook 46 may be engaged over the lateral bar 54 prior to fastening the wheel holder straps 22 and 38.

Figure 5:
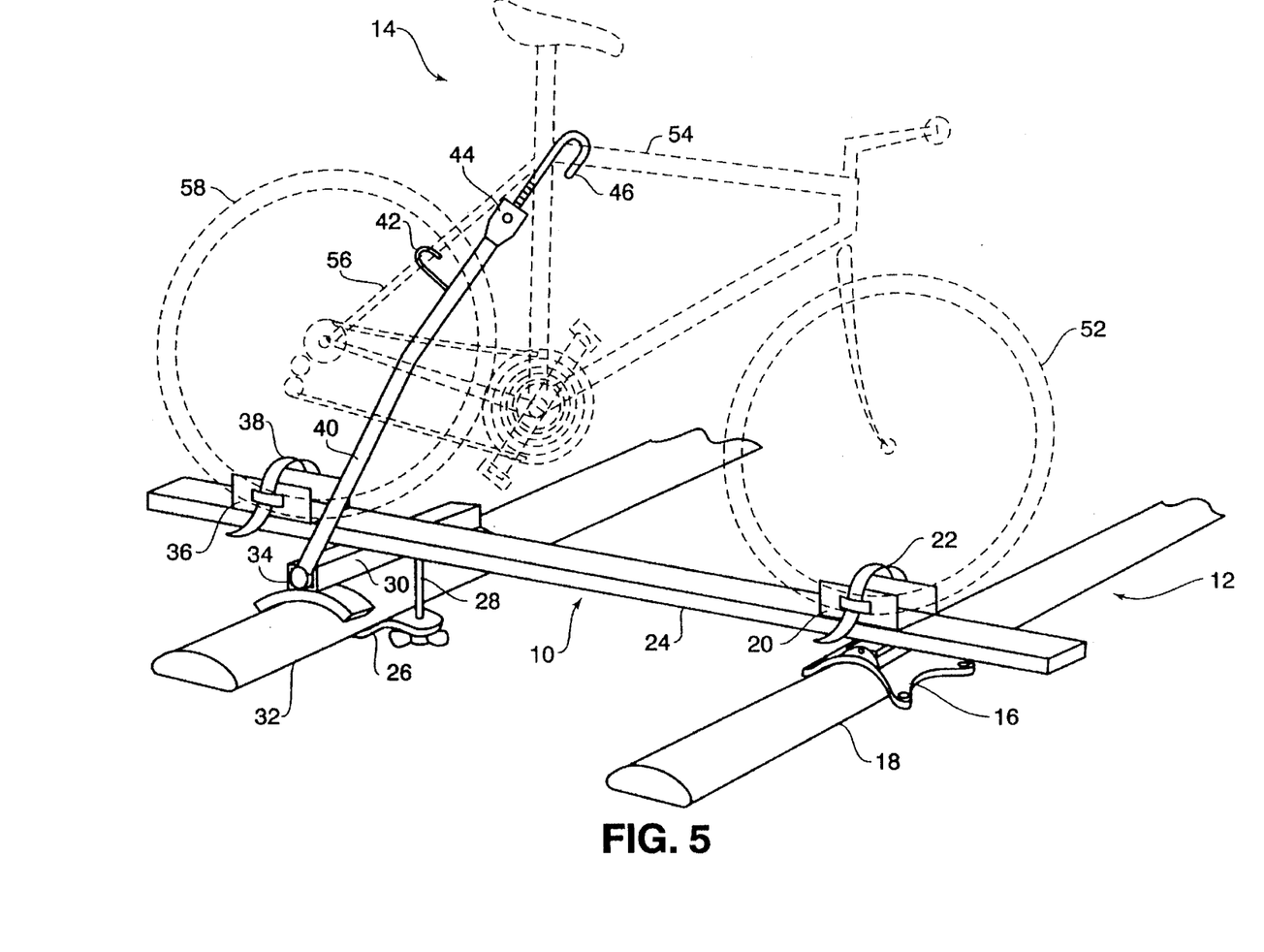
FIG. 5 is a perspective view of a bicycle installed on a ride-ready bicycle carrier of the present invention with the rear wheel of the bicycle directed toward the front of the vehicle.

A bicycle 14 mounted onto the bicycle carrier 10 with the rear of the bicycle 14 facing the front of the vehicle is shown in FIG. 5. The installation of the bicycle 14 in this orientation is nearly identical to that described above except for the following: the rear wheel 58 rests in the front wheel holder 36 and is secured by the front wheel holder strap 38; the front wheel 52 rests in the rear wheel holder 20 and is secured by the rear wheel holder strap 22; and the lower hook 42 engages the rear axle support 56 of the bicycle frame.

In either configuration, the bicycle 14 can be mounted and dismounted from the bicycle carrier 10 quickly and with minimal effort while the bicycle remains in a ride-ready condition. The innovative support arm assembly 48 not only secures a bicycle to the carrier but also facilitates the mounting of a bicycle onto the carrier by acting as a leaning post.

Thus, the ride-ready bicycle carrier of the present invention provides many benefits over the prior art. While the above description contains many specifics, these should not be construed as limitations on the scope of the present invention, but rather as an example of one preferred embodiment thereof. Many other variations are possible. Accordingly, the scope of the present invention should be determined not by the embodiment described herein, but by the appended claims and their legal equivalents.

What is claimed is:

1. A bicycle carrier for mounting a bicycle having a frame onto an existing vehicle roof rack, said bicycle carrier comprising:

a pivot support member adapted to attach to the existing vehicle roof rack;

a support arm pivot pivotally connected to said pivot support member, said support arm pivot being free to rotate about said pivot support member;

a support arm having a first end and a second end, the first end connected to said support arm pivot;

an upper support member having a first end adapted to secure a first portion of the bicycle to said bicycle carrier, said upper support member having a second end adjustably connected to said second end of said support arm;

a locking device attached to said second end of said support arm and adjustably connected to said second end of said upper support member, said locking device being adapted to lock said upper support member in a fixed position relative to said support arm; and a lower support member connected to said support arm, said lower support member adapted to secure a second portion of the bicycle to said bicycle carrier.

2. The bicycle carrier of claim 1 wherein said support arm is adapted to support the bicycle in a vertical position during installation of the bicycle onto the carrier.

3. The bicycle carrier of claim 2 wherein said first end of said upper support member comprises a hook.

4. The bicycle carrier of claim 3 wherein said hook is adapted to secure an upper lateral bar of the frame of the bicycle.

5. The bicycle carrier of claim 1 wherein said lower support member comprises a hook.

6. The bicycle carrier of claim 5 wherein said hook is adapted to secure a front fork of the bicycle or a rear axle support of the bicycle.

7. The bicycle carrier of claim 1 further comprising:

a front tire bar clamp adapted to attach to the existing roof rack;

a rear tire bar clamp adapted to attach to the existing roof rack;

a tire bar attached to said front tire bar clamp and to said rear tire bar clamp;

a front wheel holder attached to said tire bar, said front wheel holder being adapted to receive and secure a first wheel of the bicycle; and a rear wheel holder attached to said tire bar, said rear wheel holder being adapted to receive and secure a second wheel of the bicycle.

8. The bicycle carrier of claim 7 wherein said upper support member comprises a hook.

9. The bicycle carrier of claim 8 wherein said hook is adapted to secure an upper lateral bar of the frame of the bicycle.

10. The bicycle carrier of claim 7 wherein said lower support member comprises a hook.

11. The bicycle carrier of claim 10 wherein said hook is adapted to secure a front fork of the bicycle or a rear axle support of the bicycle.

12. A bicycle carrier for mounting a bicycle having a frame onto an existing vehicle roof rack, said bicycle carrier comprising:

a pivot support member adapted to attach to the existing vehicle roof rack, said pivot support member having a cylindrical bore;

a support arm pivot having a generally cylindrical shaft, said shaft being rotatably inserted into said cylindrical bore of said pivot support member providing rotational movement of said support arm pivot about said pivot support member, said shaft having a slot with a plurality of detents;

a stop pin connected to said pivot support member and inserted into said slot, a spring inserted into said cylindrical bore of said pivot support member, said spring abutting said shaft of the support arm pivot exerting a force on said shaft to engage said stop pin into said detents of said shaft of the support arm pivot;

a support arm comprising an elongate hollow shaft having a first end and a second end, the first end being connected to said support arm pivot;

an upper support member having a first end adapted to secure a first portion of the bicycle to said bicycle carrier, said upper support member having a second end having a substantially cylindrical elongated rod, said second end of said upper support member inserted into said second end of said support arm;

a locking device attached to said second end of said support arm and adjustably connected to said second end of said upper support member, said locking device adapted to lock said upper support member in a fixed position relative to said support arm; and a lower support member connected to said support arm below said upper support, said lower support adapted to secure a second portion of a frame of a bicycle to said bicycle carrier.

13. The bicycle carrier of claim 12 further comprising:

a from tire bar clamp adapted to attach to the existing roof rack;

a rear tire bar clamp adapted to attach to the existing roof rack;

a tire bar attached to said front tire bar clamp and to said rear tire bar clamp;

a front wheel holder attached to said tire bar, said front wheel holder being adapted to receive and secure a first wheel of the bicycle; and a rear wheel holder attached to said tire bar, said rear wheel holder being adapted to receive and secure a second wheel of the bicycle.

14. The bicycle carrier of claim 13 wherein said support arm is adapted to support the bicycle in a vertical position during installation of the bicycle onto the carrier.

15. The bicycle carrier of claim 14 wherein said first end of said upper support member comprises a hook.

16. The bicycle carrier of claim 15 wherein said hook is adapted to secure an upper lateral bar of the frame of the bicycle.

17. The bicycle carrier of claim 13 wherein said lower support member comprises a curved hook.

18. The bicycle carrier of claim 17 wherein said hook is adapted to secure a front fork of the bicycle or a rear axle support of the bicycle.

* * * * *

UNITED STATES PATENT AND TRADEMARK OFFICE
CERTIFICATE OF CORRECTION

PATENT NO. : 5,624,063
DATED : April 29, 1997
INVENTOR(S) : Richard Ireland

It is certified that error appears in the above-indentified patent and that said Letters Patent is hereby corrected as shown below:

In column 2, line 52, delete "from" and insert therefor --front--;

In column 5, line 4, delete "from" and insert therefor --front--;

In column 5, line 7, delete "from" and insert therefor --front--;

In column 5, line 8, delete "from" and insert therefor --front--;

In column 5, line 26, delete "from" and insert therefor --front--;

In claim 13, column 8, line 4, delete "from" and insert therefor --front--;

Signed and Sealed this

Second Day of December, 1997

Attest:

Attesting Officer

BRUCE LEHMAN

Commissioner of Patents and Trademarks